Sept. 14, 1943.  B. EDELMAN  2,329,256
MATERIAL FORMING APPARATUS
Filed Jan. 20, 1942  3 Sheets-Sheet 1

INVENTOR
B. EDELMAN
BY
E.R. Nowlan
ATTORNEY

INVENTOR
B. EDELMAN
BY
E.R. Nowlan
ATTORNEY

Patented Sept. 14, 1943

2,329,256

UNITED STATES PATENT OFFICE 2,329,256

MATERIAL FORMING APPARATUS

Beril Edelman, Brooklyn, N. Y., assignor to Western Electric Company, Incorporated, New York, N. Y., a corporation of New York Application January 20, 1942, Serial No. 427,427

9 Claims. (Cl. 164—22)

This invention relates to material forming apparatus and more particularly to apparatus for forming or punching blanks from sheet material.

The cutting out or forming of blanks from sheet stock by means of coacting, interfitting, punch and die members is a very old one, especially as embodied in the familiar punch press, in which one of the coacting members is supported on a stationary, rigid supporting block while the other is actuated by a reciprocating ram. Such machines have been and are entirely satisfactory, generally speaking, so far as the accomplishment of the desired result is concerned. However, they are usually extremely noisy and, because of the necessary reciprocation of massive parts, are wasteful of energy and require foundations far more massive and rigid than are required to support their weight. In another class of machine for the same general purpose, punch members are formed on or attached to the periphery of a wheel or roller, to coact with corresponding die members formed in or attached to the periphery of a second wheel or roller. Much of the noise and waste of power are obviated in this fashion; and such machines are satisfactory for many uses. But, in such a machine, unless the wheels or rolls are made impracticably great in diameter, the angular change of position to each other of the punch and die from the time the punch begins to enter the die until it finally leaves, may render such a machine impracticable for some classes of work.

An object of the present invention is to provide a reliable, accurately functioning apparatus for forming blanks from sheet stock in which punch and die members are caused to move toward and away from each other for the blanking operation substantially without angular motion with respect to each other and in which there are no massive reciprocatory members.

With the above and other objects in view, the invention may be embodied in a machine for blanking sheet stock wherein a sheet of stock is drawn between a pair of endless metal belts passing between a pair of opposed pressure rolls, the belts being kept in mutual registry by pins on one matching perforations on the other, one belt having die openings and the other having punch members pivotally carried thereon.

Other objects and features will appear from the following detailed description of one embodiment thereof taken in connection with the accompanying drawings in which the same reference numerals are applied to identical parts in the several figures and in which Fig. 1 is a diagrammatic view in side elevation of a machine constructed in accordance with the invention;

Fig. 4 is a broken detail section on the line 4—4 of Fig. 1 with the belt removed;

Fig. 5 is an enlarged, partial section on the line 5—5 of Fig. 4;

Figure 1:
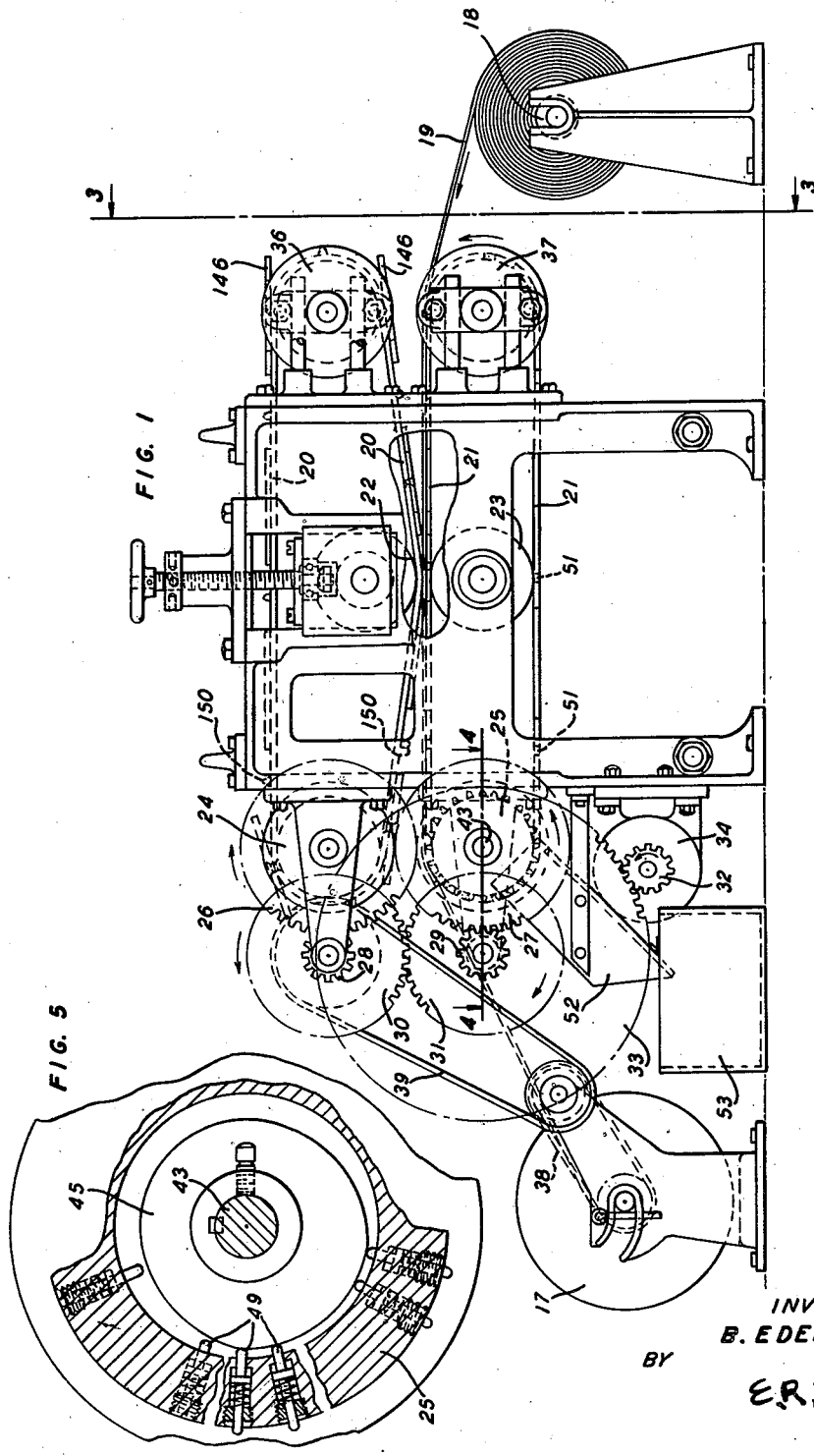

As herein disclosed the invention is illustrated in a machine for cutting blanks from a ribbon-like sheet of stock 19, drawn by the action of the machine from a supply 18, and wound up as scrap, after the blanks have been cut out, on a take-up reel 17, driven by a belt from the machine.

The heart of the machine is comprised of a pair of endless steel belts 20 and 21, having the stock 19 between them, and running with the stock between a pair of pressure rolls 22 and 23, all suitably mounted in a rigid frame. At the left end of the machine, the belt 20 runs over and is driven by a roll 24, while the belt 21 runs over and is driven by a roll 25. The rolls 24 and 25 are geared to run in synchronism by a gear chain 26, 28, 30, 31, 29, 27. The shafts of these two rolls and of the six gears just mentioned are all journalled in fixed positions in the frame. The shaft of the gear 29 is driven through gears 33 and 32 from a motor 34, and thus drives both rolls 24 and 25. At the right end of the machine, the belts 20 and 21 run over idler tensioning rolls 36 and 37 respectively, mounted to be adjustable toward and from the rolls 24 and 25 to maintain suitable tensions in the belts. The take-up roll 17 may be conveniently driven by suitable belts 38 and 39 from any of the above mentioned shafts, e. g. the shaft of gears 28 and 30 as shown.

Figure 9:
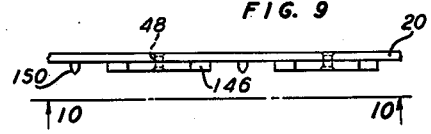
Fig. 9 is a view similar to Fig. 6 of another form of punch belt.

The belt 20 is provided on its outer side near each edge with a longitudinal row of equi-spaced driving and registering pins 40, which correspond, enter into and coact with rows of correspondingly situated and equi-spaced perforations 41, in the belt 21. The perforations 41 also correspond to and are entered by drive pins 35 on the roll 25. Thus the roll 25 drives the belt 21 and the belt 21 drives the belt 20. The pins 40 are omitted in Figs. 1, 6 and 9 to avoid confusing them with other pins also carried by the belt 20; but the pins 40 are shown in Figs. 2, 3, 7, 10 and 11. At the same time the pins 40 and perforations 41 maintain continuously accurate registration of the belts 20 and 21, both laterally and longitudinally.

The cylindrical rolls 25, 23 and 37 are so located that their respective uppermost elements are in one horizontal plane, so that the belt 21 in passing from the roll 37 over the roll 23 to the roll 25 moves substantially in a horizontal plane. The roll 36 is located somewhat up from the roll 37; and the roll 24 is similarly up from the roll 25 and about level with the roll 36; while the roll 22 is lower and presses the belt 20 down between the rolls 36 and 24 to have operative engagement between the rolls 22 and 23 with the stock 19 and the belt 21. Hence the belts 20 and 21 are spaced somewhat apart as they leave the rolls 36 and 37, approach and engage each other with the stock between at the press rolls 22 and 23, and draw somewhat apart again as they pass on to the rolls 24 and 25. This separation of the belts is somewhat exaggerated in the drawings for clarity. In practice the separation would preferably be little more than enough to allow the pins 40 to clear out of the perforations 41, especially at the right side where the belts approach the press rolls. It may also be noted that the belts 20 and 21 are preferably of equal length and hence the distance between the rolls 24 and 36 will ordinarily be a little less than that between the rolls 25 and 37.

Figure 6:
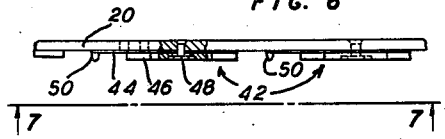
Fig. 6 is a detached edge view of a portion of a preferred form of punch belt.
Figure 7:
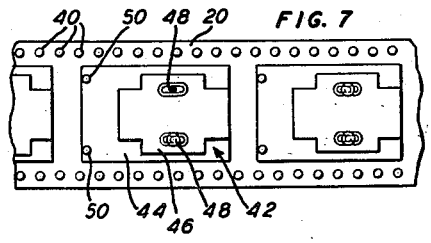
Fig. 7 is a reverse plan view of the showing of Fig. 6.
Figure 10:
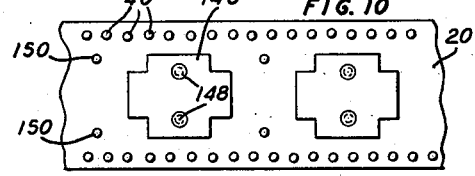
Fig. 10 is a reverse plan view of the showing of Fig. 9.
Figure 8:
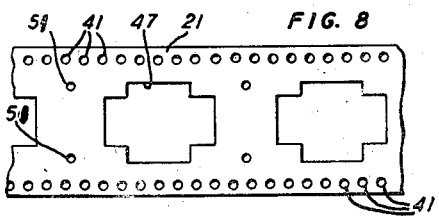
Fig. 8 is a plan view of a portion of die belt corresponding to the showing of Fig. 6.

The preferred forms of the belts 20 and 21 are best shown in Figs. 6, 7 and 8. It is to be remembered in considering these that the pins 40, shown in Fig. 7, are omitted in Fig. 6. The belt 20, as here shown, is provided along the center line of its outer side with a row of equi-spaced, compound punch members generally indicated at 42. Each such assembly comprises a base 44 and a punch proper 46 held together and secured to the belt by a pair of rivets 48. Each rivet 48 is rigid in the belt, but passes through a longitudinally elongated hole in each of the members 44 and 46. Thus the two members 44 and 46 are securely held to the belt, with substantially no freedom of motion transversely of the belt and with a limited freedom of motion longitudinally of the belt. The base 44 is a rectangular thin piece of rigid metal, e. g. steel, somewhat larger than the punch proper 46 and so assembled as to project beyond the punch member forwardly thereof, i. e. on the advancing end. Near its forward edge, the base 44 is provided with two outwardly projecting locating pins 50, spaced laterally well apart. The punch proper 46 is a flat piece of rigid metal, e. g. steel, whose contour is that of the blank to be cut from the stock and whose thickness is somewhat greater than that of the stock. The belt 21, as already noted, has the perforations 41 to coact with the pins 40 of the belt 20. The belt 21 is also formed with perforations 51 to coact with the pins 50 and with apertures 47 to coact as dies with the punches 46. The perforations 41 in the belt 21 have the double duty of driving the belt from the pins 35 and of driving the belt 20 through the pins 40. In time they may wear and tend to make the registery of the punches 46 with the die apertures 47 inexact. The arrangement of the base 44 with its locating pins 50 and of the base 44 and punch 46 with a small degree of longitudinal freedom on the belt 20, enables the pointed ended pins 50, entering the perforations 51, before the punch enters the die, to force the punch to register accurately with the die just before each cutting operation.

As shown in Figs. 6, 7 and 8, the pins 50 and perforations 51 are so located that the pins 50 punch through the material being worked on. In many instances, this is unobjectionable or even preferable as tending to hold the portion of sheet being operated on more firmly. The pins 50 and holes 51 may, however, be spaced to lie outside the width of the punch 46 if desired. Similarly, with some materials the pins 40 may also punch through the sheet being worked on, or the belts may be made wide enough and the two rows of pins 40 far enough apart to obviate this.

Figure 2:
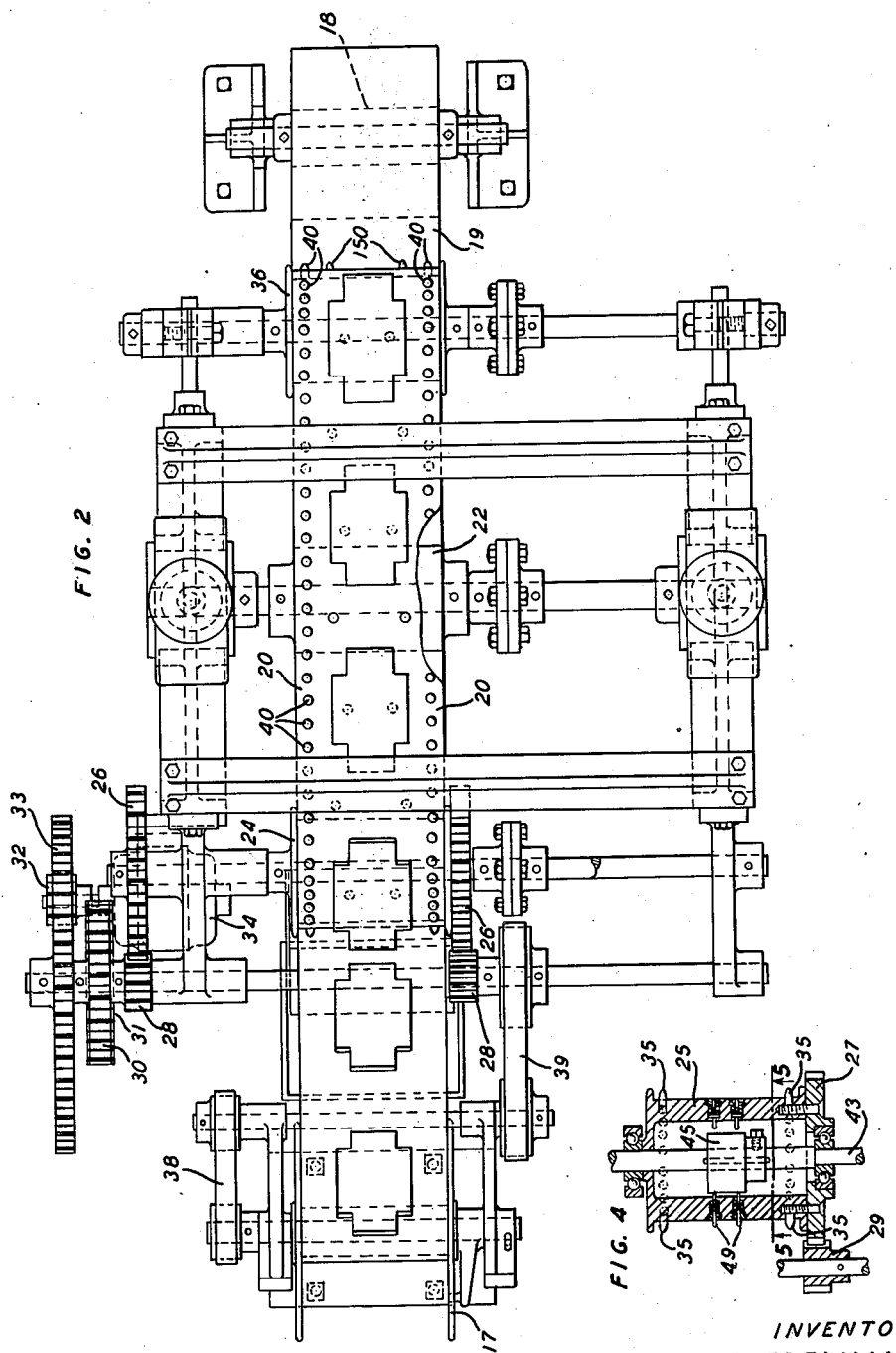
Fig. 2 is a plan view thereof.
Figure 3:
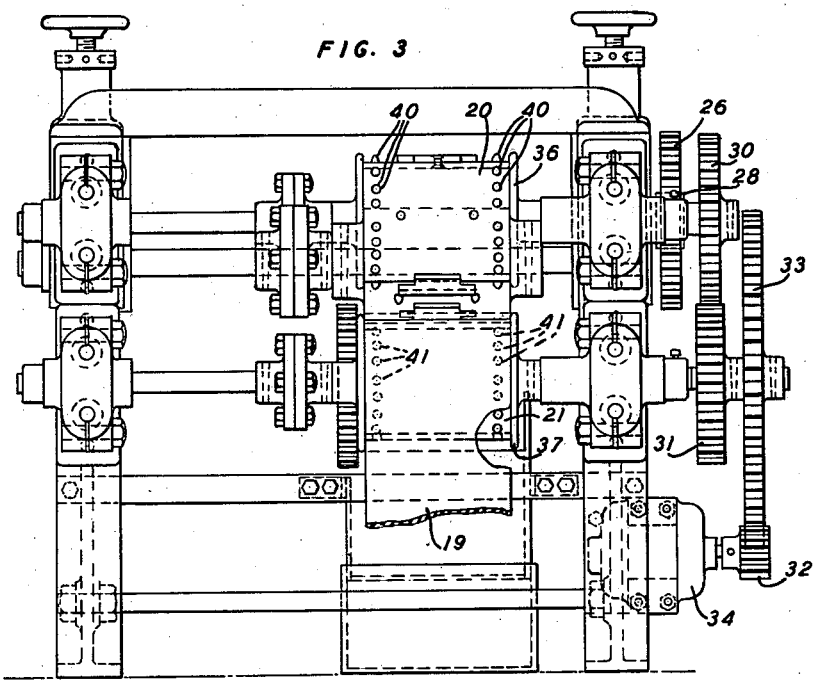
Fig. 3 is an end view thereof on the line 3—3 of Fig. 1.

In some instances the extreme nicety of registration of punch and die thus obtained may not be necessary. In such case, the punch 146 is secured directly and rigidly to the belt by the rivets 148, and the locating pins 150 are mounted directly in the belt as in the modified form shown in Figs. 9, 10 and 11. For simplicity, this form is also illustrated in Figs. 1, 2 and 3, although the form of Figs. 6, 7 and 8 may be preferred for nice work.

Figure 11:
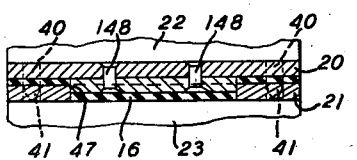
Fig. 11 is a transverse section of the two belts of Figs. 9 and 10 acting to cut a blank from a piece of stock between them.

As shown in Fig. 11, the thickness of the die belt 21 is at least great enough that each die aperture may contain both the punch and the cut blank 16. The cut blanks remain frictionally held in the die apertures after the punches have been pulled out of the dies by the separating belts leaving the press rolls. To force the blanks out of the die apertures, the mechanism shown in detail in Figs. 4 and 5, is provided. The shaft 43 of the roll 25 is made non-rotatable and the roll rotatable on the shaft. A cam 45 is rigid on the shaft inside the roll. Radial, spring pressed, knockout pins 49 are mounted radially in one or more rows (here two) circumferentially around the middle periphery of the roll 25 spaced and arranged to register, singly or in groups as the size of blank may require, with the die apertures. The cam 45 is so shaped as to force the pins radially out through the die apertures as the belt moves down over the extreme left of the roller 25 and allows them to be retired inwardly by their springs after passing the bottom of the roll. The blanks forced out of the die apertures by these pins fall through a chute 52 into some suitable container 53.

It must be emphasized that, for clarity in drawings, both the angle of approach of the belt 20 to the belt 21 at the right of the press rolls 22 and 23, and the angle of departure of the belt 20 from the belt 21 at the left of the press rolls have been considerably exaggerated. In practise, these angles may be made so small that there is practically no materially effective angular motion of the punch relatively to the die during the punching operation. Because the punch is attached to the belt 20 only along a transverse line by the rivets 48 or 148, the punch is neither curved originally nor is it flexed at any point along its travel; hence it is simple to make, being merely a flat slab of suitable outline, and is durable in use. The portion of the belt 21 passing between the press rolls 22 and 23 is also always flat; and hence the die apertures are merely suitably outlined holes in the body of the belt. There being no reciprocatory parts required, the machine is quiet in operation and generates little vibration, as well as being simple to operate and durable in character.

The embodiment diagrammed and described is illustrative of the invention and may be variously modified and departed from without departing from the scope and spirit of the invention as particularly described and pointed out in the appended claims.

What is claimed is:

1. Apparatus for cutting blanks from sheet stock and comprising a pair of flexible belts to receive sheet stock therebetween, a pair of press rolls between which the belts and stock run, a punch member attached to one belt, the other belt being formed with a die aperture to coact with the punch member, and coacting elements on the two belts to enforce registry of the punch member and die aperture.

2. Apparatus for cutting blanks from sheet stock and comprising a pair of flexible belts to receive sheet stock therebetween, means to drive one of said belts, coacting means on the two belts to cause the driven belt to drive the other belt, a pair of press rolls between which the belts and stock run, a punch member attached to one belt, and the other belt being formed with a die aperture to coact with the punch member.

3. Apparatus for cutting blanks from sheet stock and comprising a pair of flexible belts to receive sheet stock therebetween, means to drive one of said belts, coacting means on the two belts to cause the driven belt to drive the other belt, a pair of press rolls between which the belts and stock run, a punch member attached to one belt, the other belt being formed with a die aperture to coact with the punch member, and coacting elements on the two belts to enforce registry of the punch member and die aperture.

4. Apparatus for cutting blanks from sheet stock and comprising a pair of flexible belts to receive sheet stock therebetween, a pair of press rolls between which the belts and stock run, a flat slab-like punch member attached to one belt only along a line transverse to the belt, the other belt being formed with a die aperture to coact with the punch member, and coacting elements on the two belts to enforce registry of the punch member and die aperture.

5. Apparatus for cutting blanks from sheet stock and comprising a pair of flexible belts to receive sheet stock therebetween, means to drive one of said belts, coacting means on the two belts to cause the driven belt to drive the other belt, a pair of press rolls between which the belts and stock run, a flat slab-like punch member attached to one belt only along a line transverse to the belt, and the other belt being formed with a die aperture to coact with the punch member.

6. Apparatus for cutting blanks from sheet stock and comprising a pair of flexible belts to receive sheet stock therebetween, means to drive one of said belts, coacting means on the two belts to cause the driven belt to drive the other belt, a pair of press rolls between which the belts and stock run, a flat slab-like punch member attached to one belt only along a line transverse to the belt, the other belt being formed with a die aperture to coact with the punch member, and coacting elements on the two belts to enforce registry of the punch member and die aperture.

7. Apparatus for cutting blanks from sheet stock and comprising an endless flexible die belt of sheet metal having a longitudinal sequence of equi-spaced die apertures formed therein, a drive roll and a press roll and a tensioning roll for the die belt and all tangent to one plane to maintain a portion of the belt flat, the die belt being also formed with a sequence of drive perforations, drive pins on the drive roll to engage the perforations in the die belt to thereby drive the die belt, an endless flexible punch belt running with the die belt to receive sheet stock between the two belts, a longitudinal sequence of punch members on the punch belt to coact with the die apertures of the die belt, and a sequence of pins on the punch belt to engage the perforations in the die belt to thereby drive the punch belt.

8. Apparatus for cutting blanks from sheet stock and comprising an endless flexible die belt of sheet metal having a longitudinal sequence of equi-spaced die apertures formed therein, a drive roll and a press roll and a tensioning roll for the die belt and all tangent to one plane to maintain a portion of the belt flat, the die belt being also formed with a sequence of drive perforations, drive pins on the drive roll to engage the perforations in the die belt to thereby drive the die belt, an endless flexible punch belt running with the die belt to receive sheet stock between the two belts, a longitudinal sequence of punch members on the punch belt to coact with the die apertures of the die belt, a guide roll and a press roll and a second guide roll for the punch belt arranged to lead the punch belt to the die belt between the two press rolls at an angle to the die belt, and a sequence of pins on the punch belt to engage the perforations in the die belt to thereby drive the punch belt.

9. In an apparatus for cutting blanks from sheet stock and having a die apertured die belt and a punch belt to coact therewith, a punch assembly on the punch belt and comprising a punch proper, a base therefor, a registering element on the base, means to secure the base rigidly to the punch proper and to attach both to the punch belt only along a line transverse to the punch belt, and the die belt being provided with a second registering element to coact with the first named registering element to enforce accurate registry of the punch proper with a die aperture of the die belt.

BERIL EDELMAN.